(12) United States Patent
Gavin

(10) Patent No.: US 6,937,624 B1
(45) Date of Patent: Aug. 30, 2005

(54) SYSTEM FOR MANINTAINING INTER-PACKET GAPS IN CASCADE TRANSMISSION SYSTEM FOR PACKET-BASED DATA

(75) Inventor: Vincent Gavin, Galway (IE)

(73) Assignee: 3Com Corporation, Santa Clara, CA (US)

( * ) Notice: Subject to any disclaimer, the term of this patent is extended or adjusted under 35 U.S.C. 154(b) by 819 days.

(21) Appl. No.: 09/633,855

(22) Filed: Aug. 7, 2000

(30) Foreign Application Priority Data

May 13, 2000 (GB) .............................. 0011444

(51) Int. Cl.[7] .................................. H04J 3/12
(52) U.S. Cl. ........................... 370/528; 370/520
(58) Field of Search ............................... 370/230, 235, 370/236, 463, 476, 503, 504, 505, 506, 512, 514, 520, 528

(56) References Cited

U.S. PATENT DOCUMENTS

| | | | |
|---|---|---|---|
| 4,849,969 A | | 7/1989 | Annamalai |
| 5,272,728 A | | 12/1993 | Ogawa |
| 5,903,324 A | * | 5/1999 | Lyons et al. ........... 375/240.26 |
| 5,978,384 A | | 11/1999 | Kotchey |
| 6,076,115 A | * | 6/2000 | Sambamurthy et al. ..... 709/250 |
| 6,539,488 B1 | * | 3/2003 | Tota et al. .................. 713/400 |

FOREIGN PATENT DOCUMENTS

| | | |
|---|---|---|
| EP | 0339787 A2 | 11/1989 |
| EP | 0342844 A2 | 11/1989 |
| EP | 0412406 A2 | 2/1991 |

* cited by examiner

Primary Examiner—Wellington Chin
Assistant Examiner—William Schultz
(74) Attorney, Agent, or Firm—Nixon & Vanderhye P.C.

(57) ABSTRACT

A unit for receiving and re-transmitting data signals comprising multi-byte packets separated by multi-byte inter-packet gaps includes a FIFO store, a first, write, state machine for controlling the writing of packets into the FIFO and a second, read, state machine for controlling read-out of packets from the FIFO. The first state machine is controlled by a recovered clock and the second state machine is controlled by a local system clock. The first state machine is operative in a writing sequence to write into the FIFO the words of each received packet in successive locations and thereafter to cause the writing into the FIFO of a succession of idle bytes representing a selected inter-packet gap; and the second state machine is operative in response to maintain a reading sequence in arrears of the writing sequence by a selected number of said locations. The arrangement maintains the inter-packet gap despite slight differences between the recovered clock and the system clock.

3 Claims, 8 Drawing Sheets

| | | | |
|---|---|---|---|
| 1W | Write First Word to location 0. | 1R | Waiting for write to move ahead 2, Nothing to read, Produce IDLE |
| 2W | Write Second Word to location 1. | 2R | Waiting for write to move ahead 2, Nothing to read, Produce IDLE |
| 3W | Write third Word to location 2. | 3R | Read First Word from location 0. |
| 4W | Write Fourth Word to location 3. Set EOF | 4R | Read Second Word from location 1. |
| 5W | Receive Idle, nothing Written | 5R | Read third Word from location 2. |
| 6W | Receive Idle, nothing Written | 6R | Read Fourth Word from location 3. Detect EOF |
| 7W | Receive Idle, nothing Written | 7R | Waiting for write to move ahead 2, Nothing to read, Produce IDLE |
| 8W | Receive Idle, nothing Written | 8R | Waiting for write to move ahead 2, Nothing to read, Produce IDLE |
| 9W | Write First Word to location 4. | 9R | Waiting for write to move ahead 2, Nothing to read, Produce IDLE |
| 10W | Write Second Word to location 5. | 10R | Waiting for write to move ahead 2, Nothing to read, Produce IDLE |
| 11W | Write third Word to location 6 | 11R | Read First Word from location 4. |
| 12W | Write Fourth Word to location . Set EOF | 12R | Read Second Word from location 5. |
| 13W | | 13R | Read third Word from location 6. |
| 14W | | 14R | Read Fourth Word from location 7. Detect EOF |

FIG.3

| | | | |
|---|---|---|---|
| 1W | Write First Word to location 0. | 1R | Waiting for write to move ahead 2, Nothing to read, Produce IDLE |
| 2W | Write Second Word to location 1. | 2R | Waiting for write to move ahead 2, Nothing to read, Produce IDLE |
| 3W | Write third Word to location 2. | 3R | Read First Word from location 0. |
| 4W | Write Fourth Word to location 3. Set EOF | 4R | Read Second Word from location 1. |
| 5W | Receive Idle, nothing Written | 5R | Read third Word from location 2. |
| 6W | Receive Idle, nothing Written | 6R | Read Fourth Word from location 3. Detect EOF |
| 7W | Receive Idle, nothing Written | 7R | Waiting for write to move ahead 2, Nothing to read, Produce IDLE |
| 8W | Receive Idle, nothing Written | 8R | Waiting for write to move ahead 2, Nothing to read, Produce IDLE |
| 9W | Write First Word to location 4. | 9R | Waiting for write to move ahead 2, Nothing to read, Produce IDLE |
| 10W | Write Second Word to location 5. | 10R | Read First Word from location 4. |
| 11W | Write third Word to location 6 | 11R | Read Second Word from location 5. |
| 12W | Write Fourth Word to location . Set EOF | 12R | Read third Word from location 6. |
| 13W | | 13R | Read Fourth Word from location 7. Detect EOF |
| 14W | | | |

SYSTEM FOR MANINTAINING INTER-PACKET GAPS IN CASCADE TRANSMISSION SYSTEM FOR PACKET-BASED DATA

Field of the Invention

This invention relates to packet-based data transmission systems wherein message and/or control data is conveyed by means of distinct data packets wherein the packets (or frames) are or should be separated by inter-packet gaps, normally abbreviated to 'IPG', consisting of a plurality of 'idle' bytes, that is to say bytes indicating nothing other than a rest or idle state. One example of such a system is a system conforming to IEEE Standard 802.3 and particularly clauses 4.3.2.1 and 4.3.2.2 thereof The invention also relates to the transmission of such packets around a ring or cascade of units, such as may be formed by a stack of similar or compatible units. Examples of such systems are systems of stackable hubs and switches.

BACKGROUND TO THE INVENTION

In network systems wherein a clock signal is recovered from the received data, temporary stores, particularly FIFOs, are used to transfer the data from the clock domain of the receive data to the system clock domain of the receiving unit. If units are connected together as in a ring or cascade, the transmitter of one unit is the source of the recovered clock for the next unit. The source of a transmit clock for a unit may be a crystal or other substantially stable clock source. However, these clock sources generally are allowed to exhibit a certain tolerance in frequency and in practice the clock sources in a given system will all be at very slightly different frequencies. In any one unit the recovered clock and the system clock may be at approximately the same nominal fundamental frequency but will differ due to tolerances in the clock sources. A difference in the clock frequencies is generally specified and controlled for a particular interface to ensure correct operation. A tolerance of one hundred parts per million greater or less than a nominal frequency would be a typical example; thus a clock frequency of a gigahertz may be permitted to vary up to 100 Kilohertz above or below the nominal 1 gigahertz frequency.

In a system wherein the system clock of one unit, i.e. a transmitter of a packet, is at the upper range of the frequency tolerance and the system clock of the next unit (the receiver) is at the lower range there will be a difference in frequency of up to two hundred parts per million. This means that the receiver unit's system clock will lag the transmitter unit's system clock by two hundred clock cycles for every million clock cycles. If the receiver unit were trying to write a byte of data in each recovered clock cycle it would have to discard two hundred bytes for every million bytes, that is to say one byte for every five thousand bytes to prevent the filling of the receive FIFO.

Inter-packet gaps are constituted by 'idle' bytes that are placed between data packets to allow a receiver to discard bytes without using 'real', namely active data constituting part of a data packet. Network standards, such as the Standard indicated above, define the minimum inter-packet gap that is required. For Ethernet packets the standard inter-packet gap is twelve bytes.

It is normal practice for the receiver not to write the bytes of the inter-packet gap to a receive FIFO along with the recovered clock and to organise the read process so that the IPG should be reinserted. This may be done by causing a state machine, after it has read a packet, to produce 'idle' bytes until (in its own clock cycle) it detects that the write pointer has moved an appropriate distance (number of entries). If the system clock and the recovered clock were exactly the same, the data would be read from the FIFO and the same inter-packet gap would be applied. If the clocks are different then the inter-packet gap will be lost or gained. The gain of inter-packet gap is not important, because the gain will disappear at the next unit when the IPG is not written. However, the loss of inter-packet gap is more problematic, particularly in a cascade.

In such a case bytes of inter-packet gap may be lost at several nodes. In a worst case, for a particular packet a byte of inter-packet gap may be lost at each node on a ring or in a cascade and when the packets arrive at the last node on the ring the inter-packet gap has shrunk so much that the node cannot correctly receive the packet.

A current solution is to compensate for the worst case by arbitrarily increasing the number of idle bytes in an inter-packet gap such that in the worst case where a byte is lost at each interface the number of bytes of inter-packet gap received at the end of the ring is sufficient for the packet to be recovered correctly. In an M node ring wherein one byte might be lost at each node and N bytes of IPG are required for correct reception then the packet needs to commence its journey around the ring with M+N bytes of inter-packet gap. Since however by definition the inter-packet gap bytes carry no useful information, such an increase in the inter-packet gap will result in a decrease in performance.

Although it is convenient to describe the invention in terms of a gap consisting of bytes, in a more general case it may be constituted by words which are of greater or lesser length than a byte.

SUMMARY OF THE INVENTION

This invention is based on the programmable writing of some of an inter-packet gap into a receive FIFO in a unit in a cascade whereas the remaining inter-packet gap may be discarded as required.

In the specific case of an Ethernet packet, for which the maximum size is 1522 bytes, the worst case for discarding bytes of the inter-packet gap is every three packets.

In order to control when bytes of the inter-packet gap should be discarded and to prevent the discarding of bytes for the same packet, the number of bytes required for correct reception should be written to the receive FIFO. If a node receives more than the required minimum bytes of inter-packet gap, the additional bytes of inter-packet gap are not written to the FIFO. The N bytes of inter-packet gap written to the FIFO ensure that at least N bytes are read and the minimum inter-pack-et gap is maintained.

In such a scheme the number of additional bytes of inter-packet gap that need to be added to an M-node ring is (N+M/3).

If a node is required to discard bytes from an inter-packet gap and it has received more than it the required minimum bytes of inter-packet gap it may do so. If a node is required to drop idle bytes from the inter-packet gap and it only receives the minimum number, it will not discard any bytes but will instead use the FIFO space to store data until the next occasion when it receives an IPG greater than the minimum and may then recover the FIFO space by discarding the IPG so far as it exceeds the minimum number of bytes.

This scheme is described above using the example of a byte of data transferred for each clock cycle but it is applicable to cases where the data width is wider, for example a 'long word' comprising a multiplicity of bytes.

A specific example of the invention will be described with reference to the accompanying drawings.

DESCRIPTION OF PREFERRED EXAMPLE

Figure 1:
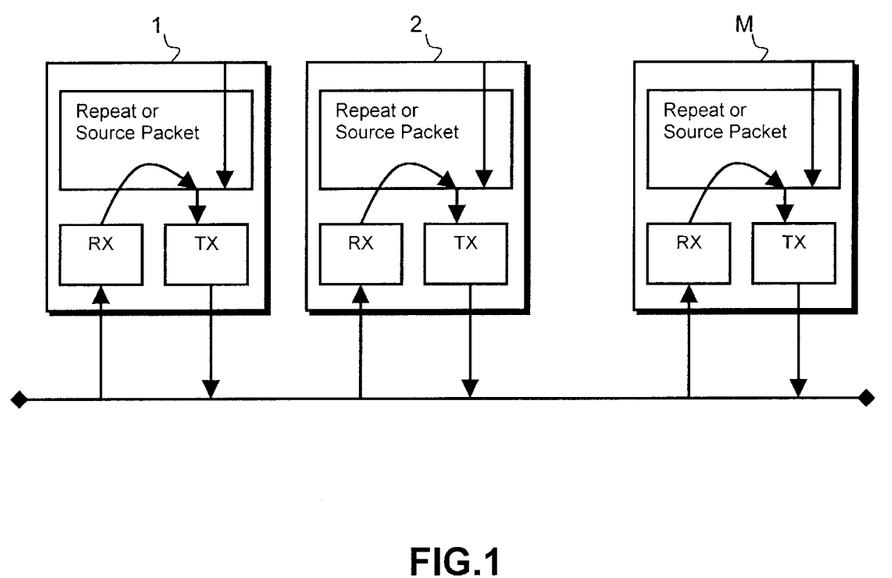
FIG. 1 illustrates a cascade including a plurality of network units.

FIG. 1 illustrates schematically several packet handling units, such as network switches in a stack; in this example the units are all similar. Unit 1 includes a receive section RX connected to a cascade, a transmit section connected in the cascade and a processing section 10 which may either receive packets from the receive section RX and forward them out on to the cascade by way of the transmit section TX or direct packets to relevant ports (not shown) in Unit 1 or, having received a packet from any one of those other ports forward the packet out on to the cascade by means of transmit section TX. The other units (Unit 2 etc up to Unit M, it being presumed there are M units in the cascade) are similarly organised. Examples of units connected in this manner are described in British Patent Publication No. GB-2338155-A and prior co-pending applications for Byham et al., Ser. No. 09/369,323 filed 6 Aug. 1999 (now U.S. Pat. No. 6,594,231), Drummond-Murray et al., Ser. No. 09/511,118 filed 23 Feb. 2000 and Gavin et al., Ser. No. 09/547,759 filed 12 Apr. 2000 (now U.S. Pat. No. 6,684,258), all assigned to the assignee of this application and incorporated herein by reference.

In this specific example, it is presumed that Ethernet packets, having a maximum size of 1522 bytes, are placed on the cascade by a unit and then as each packet proceeds around the cascade, it is received by each successive unit, stored, examined to see which may be its destination unit on the cascade and if necessary forwarded around the cascade until it reaches that destination. The operation of a cascade in this manner is fully described in the aforementioned applications.

Figure 2:
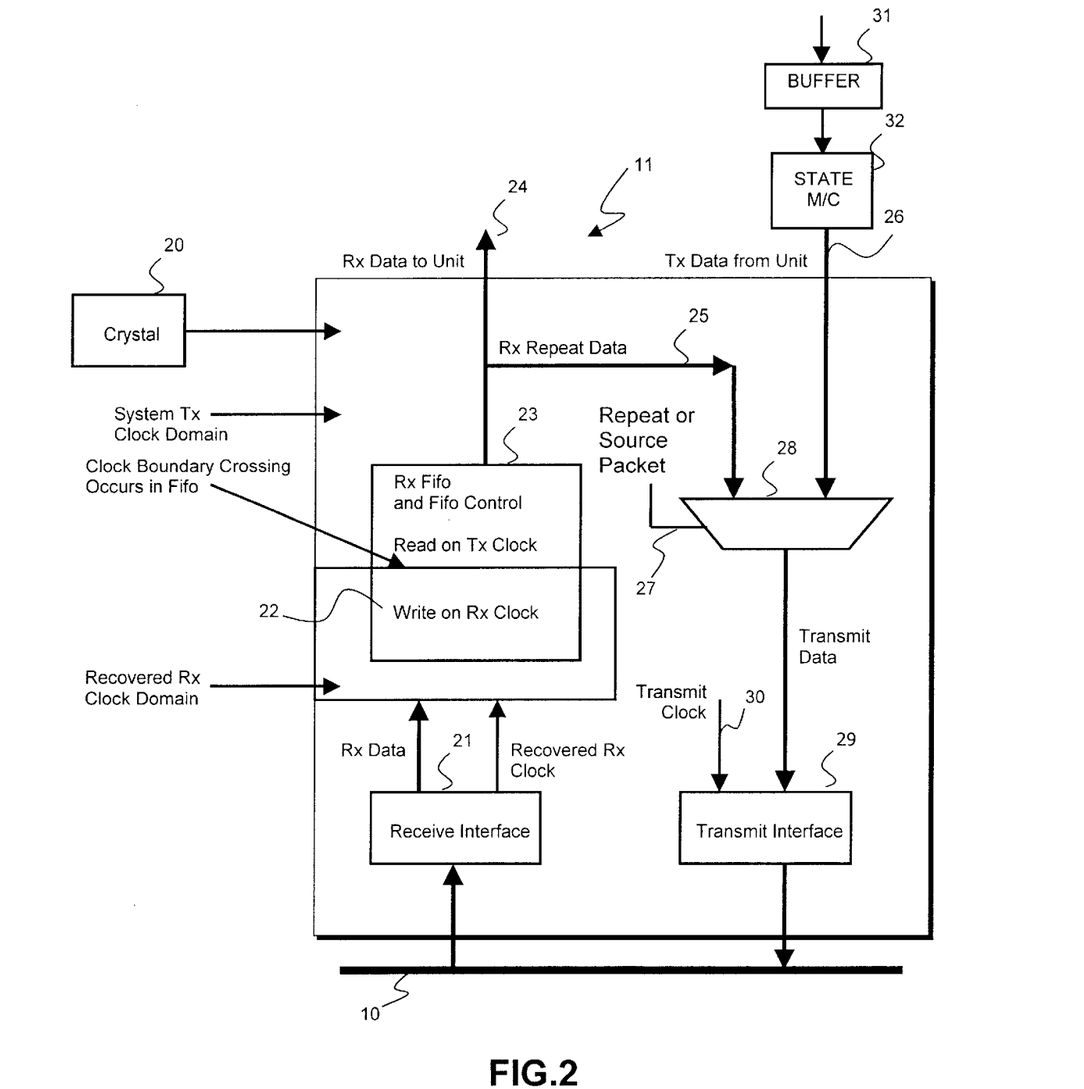
FIG. 2 illustrates part of one of the units shown in FIG. 1.

FIG. 2 illustrates schematically the clock domains and main functions of the receive (Rx) and transmit (Tx) sides in, for example, a unit 11. FIG. 2 is discussed herein as a preliminary to the discussion of FIG. 8 which explicitly shows the structure relevant to the present invention. The features shown in FIG. 2 are broadly in known form and will be discussed in conjunction with FIG. 4, which illustrates the operation of write and read state machines controlling a FIFO, and FIG. 5 which summarises the effects of discrepancy between the clocks controlling those state machines.

In FIG. 2, the numeral 10 denotes a cascade path which connects the various units 1, 2 etc shown in FIG. 1 and is the means by which packets are transferred between the units.

Packets or frames are received by a receive interface 21 and, in accordance with well known practice the data (Rx data) and an embedded clock signal (the 'recovered Rx clock') are extracted. The received data packets are read into a FIFO under the control of a state machine denoted 'Write on Rx Clock'. Packets will be read out of the FIFO by means of a state machine denoted 'Read on Tx Clock' 23. The writing of the packets into the clock occurs in a clock domain determined by the recovered clock (and therefore the transmit clock of the previous unit) whereas the reading of packets from the FIFO occurs in a clock domain which is controlled by a local or system clock, denoted schematically as 'Crystal' 20.

Data packets read out from the FIFO may proceed to the respective network unit (such as a multi-port switch) by means of lines 24 and may also be transferred to the transmit side of the port by way of lines 25. Transmit data from a buffer 31 controlled by state machine 32 may appear on lines 26 and a control shown at 27 controls a multiplexer 28 so as to select between data which is repeated or data which originates from the respective unit. Whichever data is selected is transferred to a transmit interface 29 controlled by a transmit clock 30 from 'crystal' 20 and forwarded out on to the cascade 10. The control 27 would be subject to state machine 32. In existing systems state machine 32 would ensure that packets originally sent to the cascade had a IPG.

The present invention particularly concerns the possibility of slight discrepancy between the recovered clock and the local system clock.

As mentioned previously, it is customary to control the writing of data into the FIFO and to control the reading of data from the FIFO by means of state machines which control pointers to locations in the FIFO. The construction and detailed manner of operation of the FIFO is not particularly relevant to the present invention. Normally it is defined as a multiplicity of successively addressable locations and the locations at which writing and reading may occur are controlled by a write pointer and a read pointer respectively.

Although it is conventional to prescribe and maintain a defined inter-packet gap between packets transmitted on any particular link, such an inter-packet gap being defined by data words (usually bytes) denoting an 'idle' state, the maintenance of such a gap in devices which rely on a recovered clock and a local clock for writing data into a FIFO and reading data from a FIFO depends on the maintenance of the clocks in exact correspondence.

Figure 3:
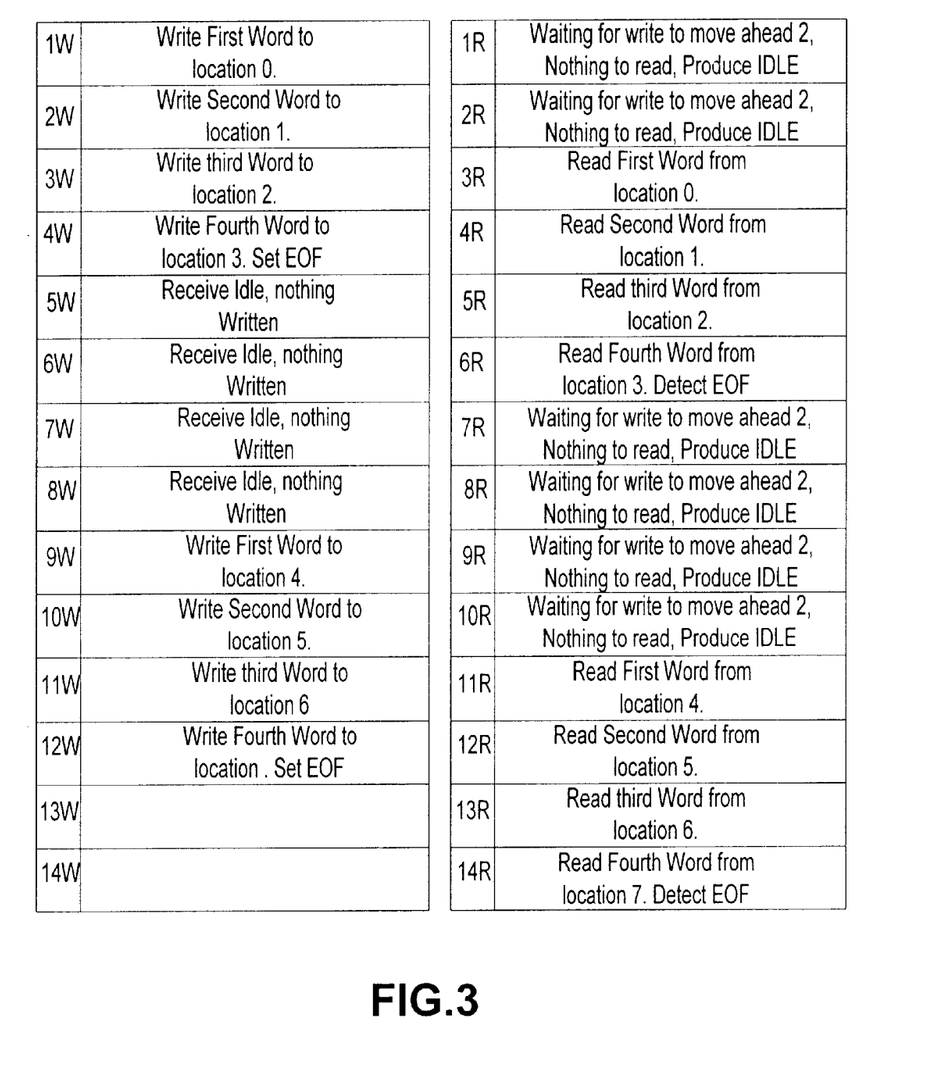
FIG. 3 illustrates the effect of different clock domains in a receive FIFO.

FIG. 3 illustrates by reference to the operation of the write and read pointers the behavior of ordinary state machines 22 and 23. In FIG. 3, the left-hand column denotes actions occurring in successive write clock periods (1W, 2W etc) whereas the right-hand column recites actions occurring in successive read clock periods (1R, 2R etc). It is customary to cause the read state machine to wait both initially and after detection of an 'end of frame' (EOF) for the write pointer to move a selected number of locations so that the reading sequence is in arrears of the writing sequence by a selected number of memory locations. The read state machine continues to read until it reaches the end of data denoted by an EOF (end of file) indicator in the FIFO and then wait until the write pointer has moved ahead again. The read state machine must allow the write state machine to move ahead to prevent the read pointer catching up the write pointer if the read frequency is slightly greater than the write frequency.

FIG. 3 illustrates the case where the read and write clocks are exactly the same. In the example given for the sake of simplicity and space, it will be supposed that each packet consists of four words and there is intended to be a standard inter-packet gap of four words between successive packets.

In the first and second write clock cycles, the write state machine is writing the first and second words to respective successive locations in the FIFO. In the fifth to eighth write clock cycles, the inter-packet cap is received (the idle words) but the write state machine writes nothing to the FIFO and the write pointer does not move. In the next set of four write clock cycles the next packet is written to locations 4 to 7 and so on. In the writing of each of the fourth words, namely the last word in each packet, there is an end of frame indicator set.

Referring to the right-hand column of FIG. 3, in the first two read cycles the read state machine is completed to wait for the write pointer to move ahead and the state machine causes the production of idle words or bytes. In this example the state machine is set up so that the write pointer has to move ahead a total of two locations. By the third read clock cycle the read state machine has detected that the write pointer has moved ahead by two locations, and during the third to sixth read cycles the words of the first packet are read from the respective locations. Then an end of frame (EOF) indicator is detected and the read state machine needs to wait again for the write pointer to move two locations ahead in the FIFO. In this case there is a wait of four clock cycles, producing the inter-packet gap constituted by four idle words. Provided that the write and read clocks are exactly the same, the eight word cycle of each of the state machines will be maintained, the write cycle consisting of the writing of four successive words constituting the packet followed by four cycles in which an idle word is received and the long read cycle consisting of four reading cycles followed by four cycles in which an idle word is produced for transmission as the inter-packet gap.

Figure 4:
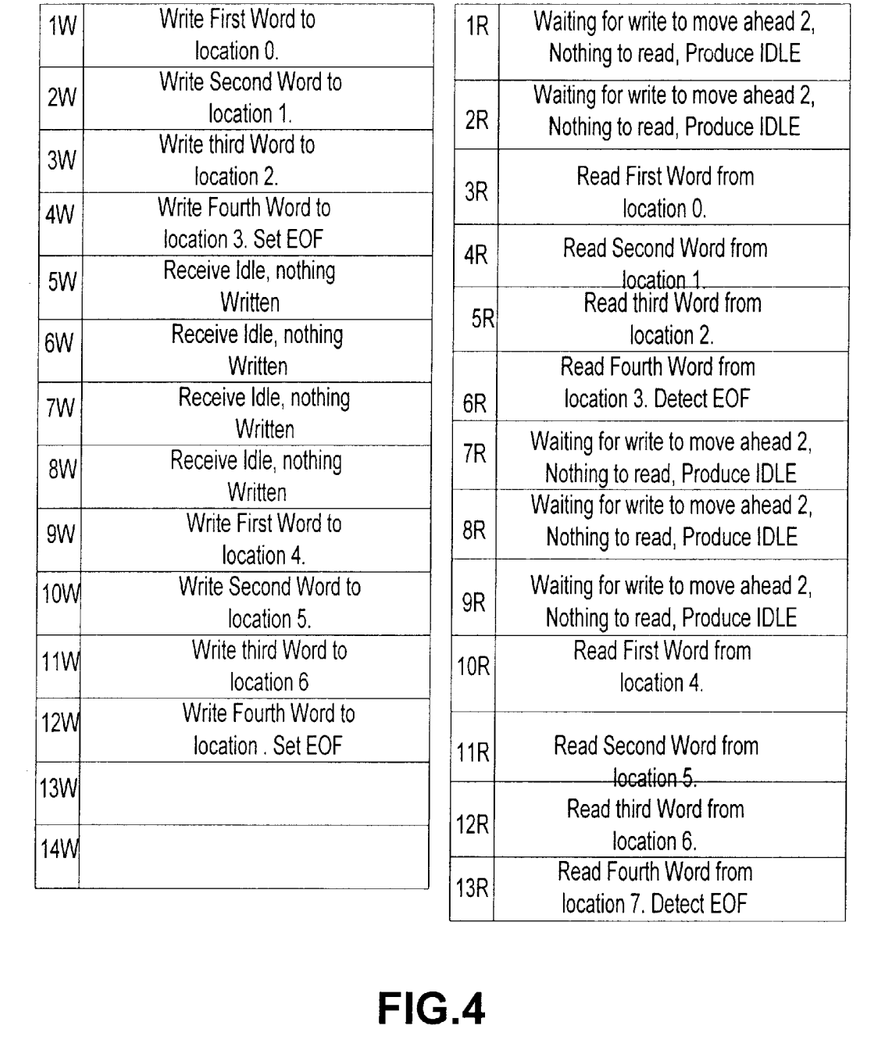
FIG. 4 depicts a situation where there are nine read cycles for ten write cycles.

FIG. 4 however shows the situation where there are nine read cycles for ten write cycles. This frequency difference has been exaggerated for the sake of simplicity. Where the read clock is slower than the write clock, the fact that the state of the read state machine is dependent on the movement of the write pointer will cause from time to time the loss of an inter-packet gap word. It will be seen that by the end of the ninth read clock cycle (after the production of three (not four) idle bytes the write pointer will have moved on two locations, i.e. from location 3 to location 5, and so during the tenth read clock cycle the read state machine reads the first word from location 4. Thereby the fourth idle word in the IPG is not regenerated.

Figure 5:
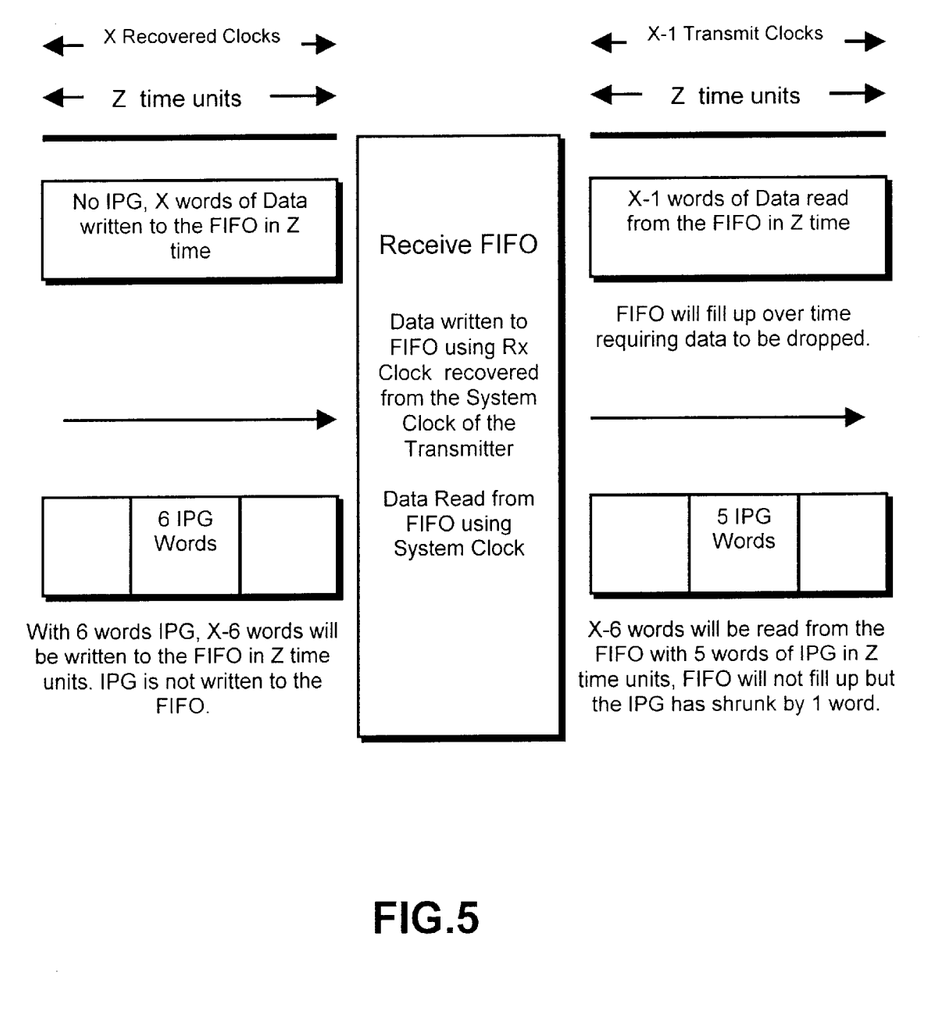
FIG. 5 provides a summary of the effects of a slower read clock than write clock.

FIG. 5 is a summary of the effect of a slower read clock than write clock. It may be remarked that by causing the read state machine to wait for the write pointer to move the specified number of locations is a means of ensuring that the read pointer does not catch up with the write pointer for a read clock which is slightly faster than the write clock. However, it will not fully cope with the phenomenon of the read clock being slower than the write clock.

FIG. 5 illustrates two possibilities. The first is where no inter-packet gap exists between packets. In that case, X-words of data will be written to the FIFO in a time Z but, assuming X-1 system clocks in Z time units, only X-1 data words will be read from the FIFO in Z time units and tile FIFO would fill up over time. To avoid this, the inter-packet gap is necessary. In Z time units and with six words of inter-packet gap, X-6 words will be written to the FIFO in Z time units. However, if there are only X-1 transmit clock cycles in Z time units, in Z time units X-6 words will be read from the FIFO and combined with five words of inter-packet gap. Although the FIFO will not fill up due to the relative slowness of the read clock, the inter-packet gap will shrink by one word.

Figure 6:
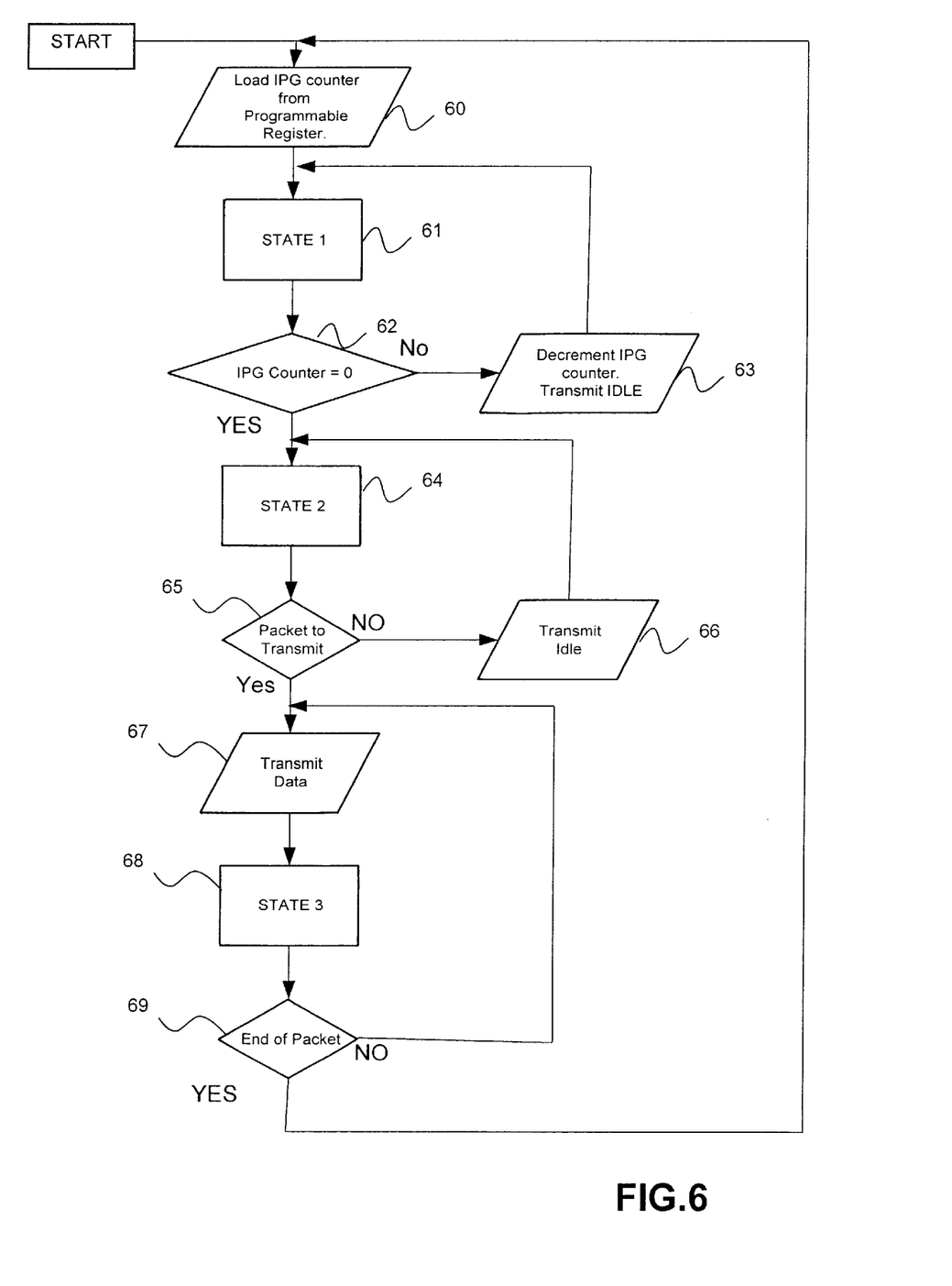
FIG. 6–8 illustrate operation of a preferred implementation.
Figure 7:
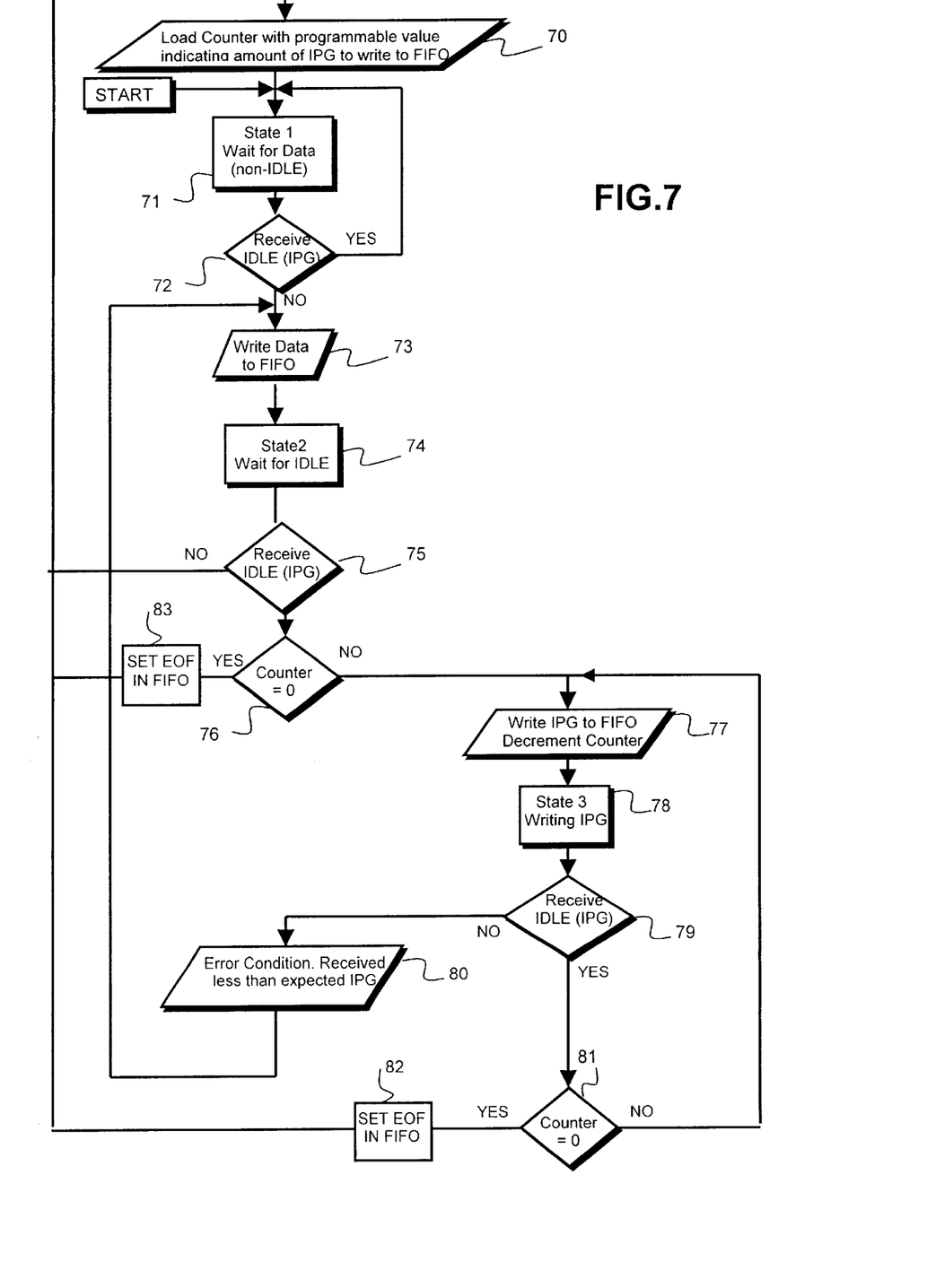
Figure 8:
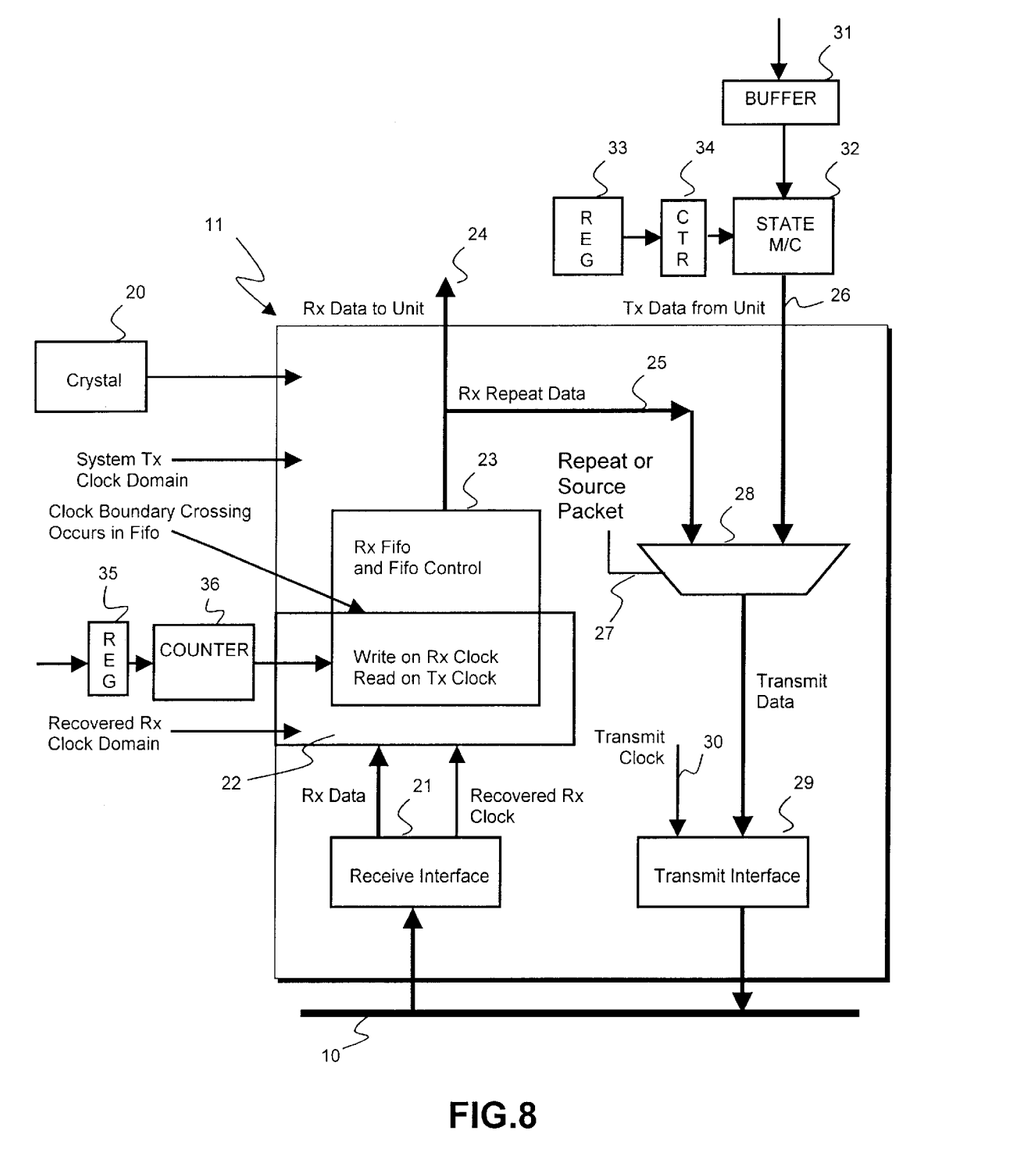

FIGS. 6 and 7 illustrate the operation of a preferred implementation of the invention in conjunction with FIG. 8. FIG. 8 resembles FIG. 2 but includes a control register 33. Control register 33 is programmable to set a counter defining a selectable number of bytes for the inter-packet gap. Preferably this number is (N1+N2) where N1 is the standard gap in byts and N2 is as given below. For controlling state machine 22 there is a programmable register 35 which sets an inter-packet gap counter 36 for the state machine 22. The operation of the state machine 32 is shown in FIG. 6 whereas the operation of the state machine 22 is shown in FIG. 7.

The operation of the state machine 32 begins with the loading of the counter from the programmable register, as denoted by stage 60. The state machine goes into STATE 1, stage 61. Transition between STATE 1 and STATE 2 (stage 64) is dependent on a test (stage 63) whether the IPG counter has timed out. If it has not, then stage 63 indicates that the IPG counter is decremented and an idle is transmitted to the FIFO.

If the IPG counter is decremented to zero, state machine enters STATE 2 (stage 64). It will determine whether there is a packet for transmission to the cascade. If there is no packet to transient, then an idle will be transmitted (stage 66). If there are words or bytes of a packet to transmit, stage 67, the packet will commence transmission, stage 67, the machine remaining in a STATE 3 (stage 68) until the end of packet is reached (stage 60).

In the usual case there will be a succession of packets waiting for transmission and state machine 32 will provide the programmable inter-packet gap between successive packets.

FIG. 7 illustrates the operation of the write state machine 22 which will be controlled by the counter 36 and the received clock. Preliminary stage 70 denotes the loading of the counter with a programmable value indicating the minimum amount of inter-packet gap that must be written to the FIFO. Stage 71 denotes the state machine's 'STATE 1' in which it is merely waiting for data. Transition from this stage depends (stage 72) on the receiving of a non-idle state. If the state is not idle then state machine writes data to the FIFO and when that writing is completed the state machine enters STATE 2 (74) in which it waits for an idle byte. If it receives an idle, it determines whether the inter-packet gap counter has decremented to zero. If that counter has decremented to zero then state machine performs operation 70 and enters STATE 1. If the counter has not decremented to zero then the idle bytes of IPG are written to the FIFO (stages 77 and 78) and the counter is decremented. This continues provided that the counter has not decremented to zero (stage 81) and provided that idles are received (stage 79). If reception of idles ceases before the counter decrements to zero there is an error condition since less than expected IPG has been received. STATE 3 writes the inter-packet gap idle bytes into the FIFO until counter decrements to zero. An error condition is indicated if fewer than the expected number of inter-packet gap bytes have been received.

In the prior example described with reference to FIGS. 3 and 4 the EOF flag is written to the FIFO when the last data word of a packet is received. Now although the EOF indicates the last word written to the FIFO in a writing sequence, it is likely to be IDLE rather than DATA. Accordingly the state machine includes stage 82 (after stage 81) and 83 (after stage 76) to show the entry of an EOF flag.

The first unit transmitting the packet onto the ring must insert the correct amount of IPG, which must be at least equal to the minimum required at the receivers. As long as each unit writes the required amount of IDLEs into the FIFO it will be able to read at least the same amount of IDLEs out and pass them onto the next unit in the ring. No unit should ever receive fewer IDLEs than the number of IDLEs it is required to write to the FIFO.

The Error case is to handle the situation in which that something goes wrong, noise on the line converts an IDLE to Data, or some clock glitch causes a drop in another byte of IDLE. These are very rare cases—but in the situation where they might happen the state machine will detect that the correct number of IDLEs was not received and then try to continue as before. It is not trying to correct the error, merely to recover from it—i.e. if the next packet is correct then the machine recovers. If fewer than the required number of bytes of IPG were received at the final destination the packet would probably be corrupted but the system should continue and if the next packet does not have the same problem it will be received satisfactorily.

The error condition is not intended to alter the operation of the state machine. A flag could then be set (or a count of the errors kept) so that software could inform some management component that these unexpected errors have occurred.

In general, where the clock tolerance is equal to T-parts per million and the maximum packet size is B-bytes, there may be a byte lost every 1,000,000/(T*B) packets. In the case of Ethernet packets with a maximum packet size of 1,522 bytes and a clock tolerance of 1 part in 5,000, the worst case for discarding bytes of the inter-packet gap is every three packets. N2 may be selected as M/3 for an M-node ring.

Although packets may be launched with (N1+N2) idle bytes of IPG and only N1 byte may be written to the next FIFO, the IPG is not thereby reduced. While the rest of the IPG (or IDLEs) is being received no writes to the FIFO occur. If there was no clock frequency difference between the write and the read clocks to the FIFO, the read state machine would start to take data out of the FIFO after a few clock cycles—to give the write a head start as previously described. It would read all the data and the IDLEs written to the FIFO. It would then detect that the FIFO was empty and 'create' IDLEs until it has detected that the write pointer has moved ahead in the FIFO again. So therefore if the clock frequencies were exactly the same the IPG after the FIFO would be the same as that before—even though only N bytes were written to the FIFO. If the read clock were slightly faster than the write clock then a byte of IPG might be lost but at least N bytes of IPG would be read out.

Thus the invention provides for a controllable excess of bytes in an inter-packet gap to be inserted and for the number of idle bytes required for correct reception to be written to the receive FIFO. If a node receives more than the required minimum bytes of inter-packet gap, the additional bytes of inter-packet gap will not be written to the FIFO. The number of bytes of the inter-packet gap written to the FIFO ensures that at least that number will be read and that the minimum inter-packet gap will be maintained.

What is claimed is:

1. A unit for receiving and re-transmitting data signals comprising multi-word packets separated by multi-word inter-packet gaps, and including:

a FIFO store, a first, write, state machine for controlling the writing of packets into the FIFO;

a second, read, state machine for controlling read-out of packets from the FIFO, wherein:

said first and second state machines are controlled by clock signals which are of similar frequency;

said first state machine is operative in a writing sequence to write into the FIFO the words of each received packet in successive locations and thereafter to cause the writing into the FIFO of a succession of words representing a selected inter-packet gap; and said second state machine is operative in response to maintain a reading sequence in arrears of the writing sequence by a selected number of said locations;

means for recovering from said packets the clock signal for the first state machine and a local system clock for providing the clock signal for the second state machine;

a multiplexer for selecting for transmission between packets from said FIFO and packets from a source thereof; and a third state machine for providing the packets from said source with an inter-packet gap selectably greater than that constituted by said succession of words.

2. A unit according to claim 1 wherein the first state machine provides an indication at the end of a writing sequence and the second state machine in response to that indication produces inter-packet gap words until it recommences a reading sequence.

3. A communication system comprising a plurality of units according to claim 1 and a common transmission path to which the units are coupled, whereby each unit receives packets from a respective previous unit and forwards packets to a respective subsequent unit.

* * * * *